W. T. HAMMETT.
ADJUSTABLE HOE.
APPLICATION FILED SEPT. 30, 1907.
899,791.
Patented Sept. 29, 1908.
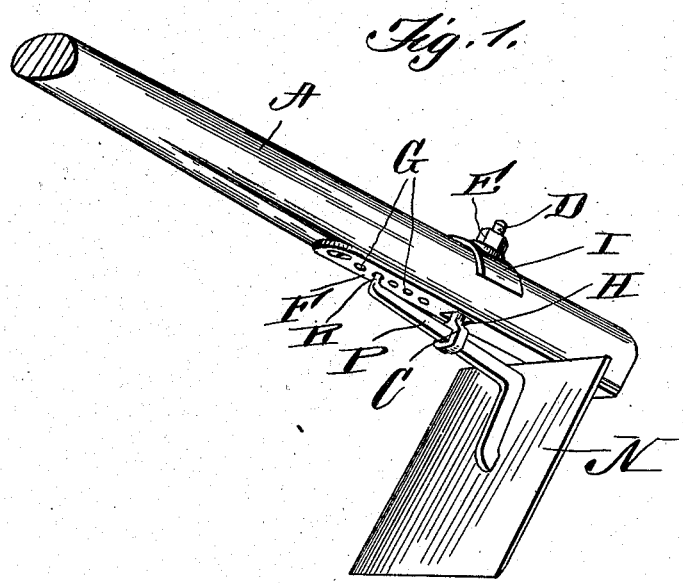
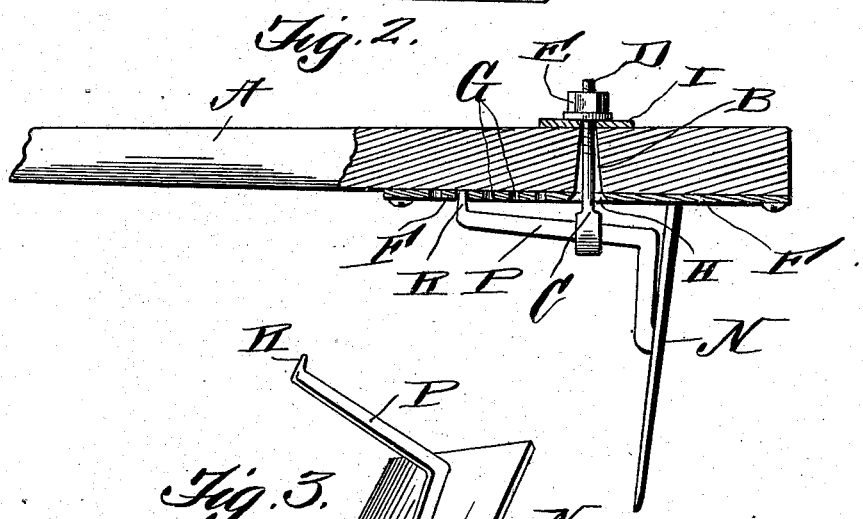
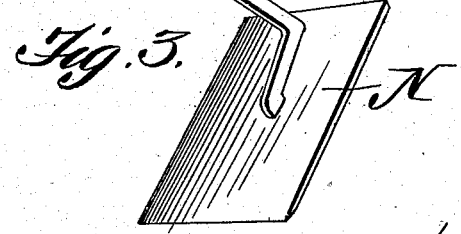
Witnesses
Inventor
W. T. Hammett,
By Franklin H. Hough
Attorney

UNITED STATES PATENT OFFICE.

WESLEY T. HAMMETT, OF RINGGOLD, LOUISIANA.

ADJUSTABLE HOE.

No. 899,791.  Specification of Letters Patent.  Patented Sept. 29, 1908.

Application filed September 30, 1907. Serial No. 395,263.

*To all whom it may concern:*

Be it known that I, WESLEY T. HAMMETT, a citizen of the United States, residing at Ringgold, in the parish of Bienville and State of Louisiana, have invented certain new and useful Improvements in Adjustable Hoes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in adjustable hoes, and comprises various details of construction, combinations and arrangements of parts as will be hereinafter more fully described and illustrated in the accompanying drawings.

My invention is illustrated in the accompanying drawings, which with the letters of reference marked thereon, form a part of the present application, and in which, Figure 1 is a perspective view of the invention, Fig. 2 is a central sectional view, and Fig. 3 is a detail view of the hoe.

Reference now being had to the details of the drawings by letter A designates a handle, made of any suitable material, and is provided with an aperture B to receive an eye bolt C, having a threaded end D upon which a bur or nut E is fitted. F designates a bar, provided with a series of perforations G therein, and H designates a hole in said bar for the reception of the shank of said eye bolt as shown in the drawings. A washer I is placed against the handle and is concaved to conform to the curvature of the handle, and has an aperture to receive the shank of the eye bolt. The hoe N has an angled shank P, of such a size as to snugly pass through the eye of said bolt, and the free end of said shank P is bent to form a hook R, and preferably is pointed.

In adjusting the hoe to the handle, the shank of the hoe, is passed through the eye of the bolt, and the hooked end of the shank, engaged in any one of the perforations of said bar, and by the tightening of the nut on the bolt, the shank of the hoe, may be drawn tightly against the handle, or the perforated bar. The heel of the hoe, is designed to engage the side of the handle, and is held securely thereagainst as the nut on the bolt is tightened.

By the provision of a device as shown and described, it will be noted that a simple and efficient device is produced, and so arranged that the hoe may be readily detached from the handle, when desired, and replaced adapting the handle for use with different shapes of heads, blades &c.

What I claim, is,

An adjustable hoe comprising a handle with a transverse aperture therein, said handle having a convexed surface and flattened upon its under edge, an apertured plate fastened to the flattened surface of the handle and provided with a series of apertures, an eye bolt passing through registering apertures in said handle and plate, a concaved clamping plate adapted to engage the convexed surface of the handle, a nut upon the threaded end of the bolt adapted to engage said concaved clamping plate, a hoe having a shank fixed thereto, said shank adapted to have a longitudinal movement through the eye of said bolt with its free end engaging a perforation in said plate, the heel of the hoe being adapted to be held by said eye bolt in different positions with the hoe and at the same angle to the hoe, as set forth.

In testimony whereof I hereunto affix my signature in the presence of two witnesses.

WESLEY T. HAMMETT.

Witnesses:
 D. P. BATCHELOR,
 O. G. THOMAS.